United States Patent [19]

Melone

[11] 4,154,138
[45] May 15, 1979

[54] SCREW WITH PLASTIC HEAD

[75] Inventor: Robert R. Melone, Rockford, Ill.

[73] Assignee: Elco Industries, Inc., Rockford, Ill.

[21] Appl. No.: 905,170

[22] Filed: May 12, 1978

Related U.S. Application Data

[63] Continuation-in-part of Ser. No. 745,364, Nov. 26, 1976, abandoned, which is a continuation-in-part of Ser. No. 651,151, Jan. 21, 1976, abandoned.

[51] Int. Cl.² ............................................. F16B 23/00
[52] U.S. Cl. ................................... 85/1 JP; 85/9 R; 85/54
[58] Field of Search ................... 85/9 R, 1 JP, 53, 54

[56] References Cited

U.S. PATENT DOCUMENTS

| | | | |
|---|---|---|---|
| 563,969 | 7/1896 | Kempshall | 85/54 |
| 2,213,708 | 9/1940 | Lange | 85/54 X |
| 2,751,806 | 6/1956 | Dickie | 85/9 R |
| 2,795,144 | 6/1957 | Morse | 85/1 JP |
| 3,121,365 | 2/1964 | Hayashi | 85/54 X |
| 3,452,636 | 7/1969 | Cohen et al. | 85/1 JP |
| 3,557,654 | 1/1971 | Weidner | 85/9 R |
| 3,618,444 | 11/1971 | Kay et al. | 85/9 R |
| 3,693,495 | 9/1972 | Wagner | 85/9 R |
| 3,803,972 | 4/1974 | Deutsher | 85/9 R X |
| 3,897,712 | 8/1975 | Black | 85/9 R |

FOREIGN PATENT DOCUMENTS

| | | | |
|---|---|---|---|
| 6600258 | 1/1966 | Netherlands | 85/9 R |
| 830722 | 3/1960 | United Kingdom | 85/1 JP |
| 953009 | 3/1964 | United Kingdom | 85/54 |

*Primary Examiner*—Rodney H. Bonck
*Attorney, Agent, or Firm*—Leydig, Voit, Osann, Mayer & Holt, Ltd.

[57] ABSTRACT

A screw includes a metal portion having a threaded shank adapted to be threaded into a workpiece, a head and an annular flange between the head and the shank. The surface of the metal head and the upper surface of the metal flange are irregular so that, when a plastic portion is molded around the head and flange of the metal portion, the metal and plastic portions are relatively fixed to each other. The plastic portion includes a thin skirt which extends around the periphery of the flange and further includes a thin radially extending section which mates with an annular rib extending around the periphery of the underside of the flange to reduce the possibility of failure of the plastic portion as that portion is forced against a workpiece. The section of the plastic portion extending radially under the flange is formed with depending rings which deform and form a seal as the fastener is threaded down to bring the radially extending section toward engagement with the workpiece.

1 Claim, 4 Drawing Figures

SCREW WITH PLASTIC HEAD

CROSS-REFERENCE TO RELATED APPLICATION

This application is a continuation-in-part of my copending application Ser. No. 745,364, filed Nov. 26, 1976, and now abandoned, which, in turn, is a continuation-in-part of my copending application Ser. No. 651,151, filed Jan. 21, 1976 and now abandoned.

BACKGROUND OF THE INVENTION

The present invention relates to a screw of the type which includes a metal portion having a threaded shank adapted to be threaded into a workpiece, a head above the shank and an annular flange between the head and the shank. A plastic portion is molded around the head and flange of the metal portion so that the two portions are relatively fixed to each other.

That part of the plastic portion which surrounds the head is shaped to receive a driving tool. The plastic extends downwardly around and radially under the flange so that the section beneath the flange engages the workpiece when the screw is tightened into the workpiece.

Examples of screws of this type are shown in Wagner U.S. Pat. No. 3,693,495 and Kay U.S. Pat. No. 3,618,444. With prior constructions, the plastic portion tends to split or otherwise fail as the plastic extending radially beneath the flange is forced against the surface of a workpiece or when the workpiece subsequently exerts a force against the flange.

SUMMARY OF THE INVENTION

The general object of the invention is to provide a new and improved plastic headed screw which reduces the likelihood of failure of the plastic head when the latter is forced against a surface of a workpiece as the screw is threaded into place and when a force is later exerted on the head by the workpiece.

Another object is to achieve the foregoing by providing an annular rib around the periphery of the underside of the flange of the metal portion and by providing the plastic portion with a skirt which is comparatively thin and rigid and which includes a thin section extending radially under the rib, the radially extending section having a bead which hooks around the rib to inhibit radial expansion of the plastic portion as the radially extending section is forced toward a workpiece surface and also having novel rings for forming a seal between the screw and the workpiece surface.

DETAILED DESCRIPTION OF THE PREFERRED EMBODIMENT

Figure 1:
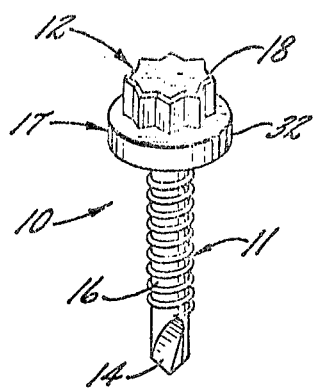
FIG. 1 is a perspective view of a screw incorporating my invention.
Figure 2:
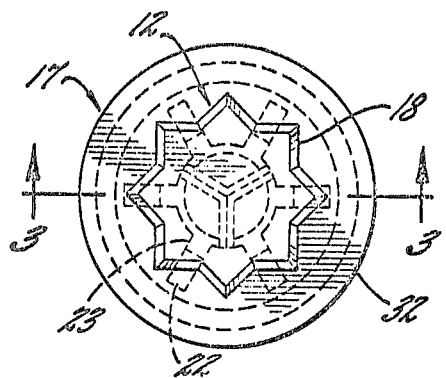
FIG. 2 is an enlarged top view of the screw.

As shown in the drawings for purposes of illustration, the invention is embodied in a screw 10 which includes a metal shank 11 and a plastic head 12, the head being made of plastic to prevent corrosion and for decorative purposes. The tip 14 of the shank is formed to drill a hole in a workpiece 15 (FIG. 3) and the lower convolutions of a thread 16 on the shank 11 form threads (not shown) in the workpiece to mate with the upper convolutions.

Figure 3:
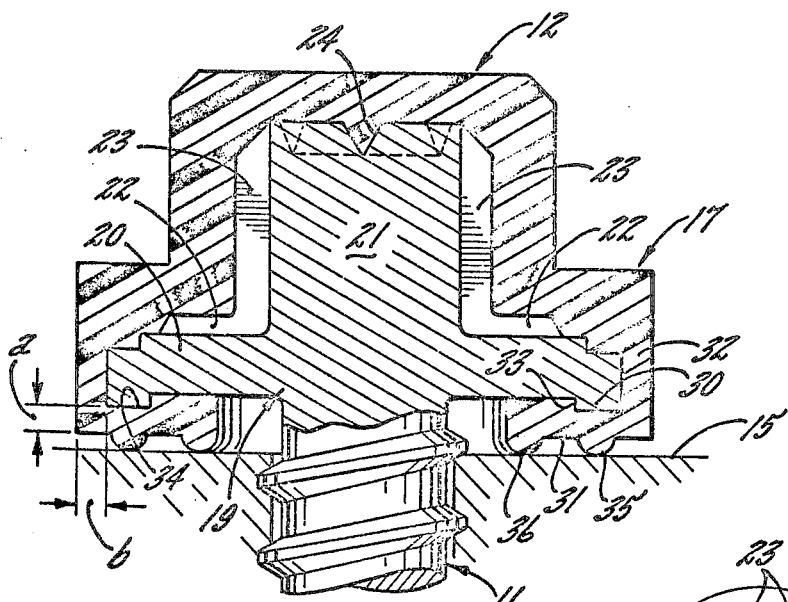
FIG. 3 is an enlarged fragmentary sectional view taken along the line 3—3 of FIG. 2.

The plastic head 12 includes an annular flange 17 above the shank and further includes a double-square or eight-point portion 18 which is adapted to be received in the socket of a driving tool. When the screw 10 is fully threaded into the workpiece 15, the underside of the flange 17 bears against the opposing surface of the workpiece as shown in FIG. 3. The workpiece may be a sheet metal roof or siding panel which is fastened in place by the screw.

Figure 4:
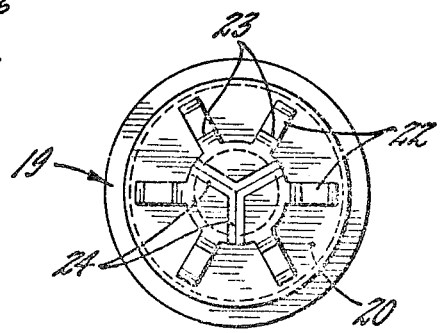
FIG. 4 is a top view of the metal portion of the screw.

In order to secure the plastic head 12 to the shank 11 and cause the two to turn together, the shank is a part of a unitary metal piece 19 which, in addition to the shank, includes an annular flange 20 above the shank and a generally cylindrical portion or head 21 above the flange 20. Radial ribs 22 (FIG. 4) are formed on the top of the flange 20, axial ribs 23 (FIG. 3) are formed on the sides of the cylindrical portion 21 and grooves 24 are formed in the top of the cylindrical portion 21. The plastic head 12 encases the cylindrical portion 21 and the flange 20 of the metal piece 19 with the plastic of the head filling the grooves 24, the spaces between the ribs 22 and the spaces between the ribs 23 to help insure that the metal piece and hence the shank 11, rotates with the plastic head.

The plastic for the head 12 is a very strong and rigid engineering plastic and preferably consists of a mixture of nylon and glass such as fiber glass, the fiber glass serving to reinforce the nylon and prevent deflection of the nylon. Customarily, the head is molded around the metal portion 19 by injection molding techniques. If color is desired, a suitable pigment may be added to the plastic.

The present invention contemplates the provision of a novel arrangement of and coaction between the plastic head 12 and the metal piece 19 to materially reduce the possibility of the head splitting or otherwise failing as the head is tightened down against the workpiece 15. This arrangement includes a rib 30 formed around the periphery of the flange 20 of the metal piece 19 and mating with that section 31 of the plastic head 12 which extends under the flange, the section 31 being a radially extending section formed integrally on the lower end of a skirt or longitudinal section 32 which extends around and alongside the edge or periphery of the metal flange 20. An annular bead 33 is formed integrally with and projects upwardly from the radially extending section 31 and includes an outer radially facing surface which engages the shoulder defined by the inner surface of the rib 30. The radially extending section 31 is a comparatively thin annulus so that the flange 20 is relatively close to the surface of the workpiece 15. The skirt section 32 also is thin. Desirably, the sections 31 and 32 are made as thin as possible within the limits of good molding practice. It has been found that this arrangement inhibits the tendency of the plastic to expand radially and thereby reduces the possibility of the plastic failing as by splitting when forced against the workpiece 15.

In the preferred form, the rib 30 is narrow, projects downwardly from the underside of the flange 20 and extends continuously around the margin of the flange, the inner surface of the rib defining a circular, radially facing shoulder for engaging the outer surface of the bead 33. The rib 30 projects into a complementally shaped recess 34 defined between the skirt 32 and the bead 33, the recess being formed automatically as an incident to the molding of the plastic head 12.

As stated above, the radially extending section 31 is comparatively thin. The thickness of the radially extending section 31 (the dimension a in FIG. 3) should be in the range of 0.020 to 0.035 of an inch and preferably 0.025 of an inch. The thickness of the skirt 32 (the dimension b in FIG. 3) is of the same range and preferably is of the same thickness as the radially extending section 31.

Advantageously, sealing means in the form of two concentric rings 35 and 36 (FIG. 3) are molded integrally with the plastic head 12 and project downwardly from the radially extending section 31. Herein, the outer ring 35 is spaced inwardly from the outer periphery of the radially extending section 31 and underlies the rib 30. The inner ring 36 is located at the inner edge portion of the radially extending section 31. After the screw 10 has been threaded into the workpiece 15 to the point where the rings 35 and 36 engage the workpiece 15 as shown in FIG. 3, further tightening of the screw results in the rings 35 and 36 softening by virtue of frictional heat. This causes the rings 35 and 36 to flatten and, in their flattened condition, the rings form a seal between the fastener head 12 and the workpiece 15.

The axial thickness of each ring 35, 36 is approximately 0.015". Thus, the underside of the rib 30 is spaced about 0.040" from the workpiece 15 when the rings first engage the workpiece.

It will be observed that a screw 10 constructed in the manner described above provides a plastic head 12 which, as compared to prior screws of this type, is substantially less likely to fail when the screw is tightened into the workpiece 15. Moreover, the head 12 seals against the workpiece 15 by virtue of the rings 35 and 36.

I claim:

1. A screw comprising a metal portion and a plastic portion, said metal portion being integral and including a head, an elongated and axially extending threaded shank and a circular flange located between and projecting radially from said head and said shank, said flange having an upper surface adjacent said head and a lower surface adjacent said shank, the head and the upper surface of said flange being of irregular contour, a continuous annular rib formed integrally with said flange and depending from the outer peripheral portion of the flange, said rib having a bottom surface and also having an inner surface defining a circular, radially facing shoulder, said plastic portion being hard and rigid and being molded from a mixture of nylon and glass, said plastic portion having a head section molded over the head of said metal portion and across the upper side of said flange and mating with the irregularities in said head and said flange to fix said plastic portion rigidly to said metal portion, said plastic portion further including (a) an annular skirt formed integrally with and depending from the outer peripheral portion of said head section and extending around and downwardly alongside the outer periphery of said flange and the outer surface of said rib, said skirt being relatively thin and having a thickness in the range of 0.020 to 0.035 of an inch, (b) a radially extending section integral with the bottom of said skirt and disposed in underlying engagement with the bottom of said rib, said radially extending section having a thickness within said range and having an inner periphery which is spaced outwardly from said shank, (c) an outer sealing ring formed integrally with and depending from said radially extending section and disposed beneath said rib, (d) an inner sealing ring concentric with said outer ring and formed integrally with and depending from the inner peripheral portion of said radially extending section, said rings having lower surfaces adapted to clamp and seal against a workpiece when said screw is tightened, and (e) an annular bead formed integrally with and projecting upwardly from said radially extending section, said bead having an outer radially facing surface located in engagement with said shoulder to restrict outward radial expansion and structural failure of said skirt when said rings are clamped against the workpiece.

* * * * *